United States Patent [19]

Hays

[11] Patent Number: 4,625,018

[45] Date of Patent: Nov. 25, 1986

[54] AZO PIGMENT COMPOSITION CONTAINING A LAKED AZO PIGMENT AND FORTIFIED LATEX

[75] Inventor: Byron G. Hays, Verona, N.J.

[73] Assignee: Inmont Corporation, Clifton, N.J.

[21] Appl. No.: 768,937

[22] Filed: Aug. 26, 1985

Related U.S. Application Data

[63] Continuation of Ser. No. 513,685, Jul. 14, 1983, abandoned.

[51] Int. Cl.$^4$ .................. C09B 29/15; C09B 45/22; D06P 1/44; D06P 1/52
[52] U.S. Cl. .................. 534/724; 106/308 Q; 106/309; 106/288 Q; 534/882
[58] Field of Search .................. 534/724, 882; 106/288 Q, 308 Q, 309

[56] References Cited

U.S. PATENT DOCUMENTS

| | | | |
|---|---|---|---|
| 1,803,657 | 5/1931 | Siegel | 534/882 X |
| 2,117,860 | 5/1938 | Siegel | 534/882 X |
| 2,225,665 | 12/1940 | Siegel | 534/724 X |
| 3,520,870 | 7/1970 | Dombrosui | 534/724 X |
| 4,217,273 | 8/1980 | Von | 534/882 X |

OTHER PUBLICATIONS

Hamilton et al., Chemical Abstracts, vol. 93, #96870x (1980).
Hemmerich et al., Chemical Abstracts, vol. 91, #22529k (1979).
Henning et al., Chemical Abstracts, vol. 92, #182625m (1980).

*Primary Examiner*—Floyd D. Higel
*Attorney, Agent, or Firm*—Emil Richard Skula

[57] ABSTRACT

Novel red azo pigment—fortified latex compositions for use in printing inks. The novel pigment compositions have superior burn-out resistance and color strength. The novel pigment compositions are made by coupling orthanilic acid derivatives (including optionally, disulfonated amine derivatives) with B-napthal precipitating the metal salts and mixing with fortified latex dispersions. The fortified latex dispersion comprises a dispersed polymer phase in a dissolved polymer phase. The dispersed polymer is preferably a high molecular weight copolymer while the soluble polymer is preferably a low molecular weight acrylic copolymer containing carboxyl group functionality. The novel pigment compositions have superior color strength.

11 Claims, No Drawings

AZO PIGMENT COMPOSITION CONTAINING A LAKED AZO PIGMENT AND FORTIFIED LATEX

This is a continuation of application Ser. No. 513,685, filed July 14, 1983, now abandoned.

BACKGROUND OF THE INVENTION

1. Field of the Invention

This invention relates to compositions containing red Azo pigment salts. Specifically, the present invention relates to the compositions comprising the salts of C.I. Pigment Red 69 or C.I. Pigment Red 70 and a fortified latex.

2. Description of the Prior Art

Azo pigments have long been known in the graphic arts field. The use and preparation of azo pigments is well known in the art. These pigments are typically prepared by diazotizing various aromatic amino sulfonic acids and then coupling the intermediates with a compound such as Beta-naphthol or 2-hydroxy-3-naphthoic acid. The azo pigments are frequently laked with various bivalent metal salts to form cation—pigment salts having varied color characteristics.

U.S. Pat. No. 2,225,665 discloses manganese salts of red azo pigments for use in resinated coating compositions. These pigments are manufactured by coupling various aromatic amino sulfonic acids with Beta-hydroxy naphthoic acid. The pigment salts exhibited improved color retention.

High-hiding calcium color lakes having great full-shade brillance and improved light fastness are disclosed in U.S. Pat. No. 4,248,635. The azo pigment compositions disclosed in this patent have improved characteristics attributable to a predominant particle size less than 0.3 μm.

New red dye pigments having improved tinctorial strength and fastness to light are disclosed in U.S. Pat. No. 3,545,992. These pigments are manufactured by coupling various O-amino benzenesulfonic acids with B-hydroxynaphthoic acid and reacting the pigments with combinations of metal salts to form multiple metal salt pigment complexes.

U.S. Pat. No. 4,190,578 discloses the azo coupling of pigment compounds in the presence of the precipitating metal salt so that coupling and precipitation take place simultaneously. This patent discloses the dialysis monitored preparation of metal salts of azo pigments.

There is, in addition, known art in the field dealing with various treatments of azo pigments and various compositions of azo pigments, resulting in pigment compositions with superior characteristics. U.S. Pat. No. 4,217,273, for example, discloses a process for preparing azo pigment compositions containing a modifier composition to improve the properties of the azo pigments. The modifier composition is prepared by chlorinating 2-hydroxy-3-naphthoic acid with a hypochlorite. The resulting compositions have increased color strength.

Colored latex and rubber products containing improved azo dyes are disclosed in U.S. Pat. No. 2,117,860. The brilliancy and light fastness of the colored rubber and latex products was improved. The azo dyes were made by coupling various diazotized aromatic amino sulfonic acids with 2-naphthol-3-carboxylic acid and laking with various metal salts. The rubber or latex compositions were made by physically milling the pigment lakes and rubber or latex between steel rolls.

U.S. Pat. No. 4,244,863 discloses a process for manufacturing azo pigment compositions with improved dispersibility. The pigment compositions are made by coagulating an aqueous azo pigment suspension in an aqueous latex of a polymer or polycondensate containing carboxyl groups, or an aqueous solution of a polymer or polycondensate containing carboxyl groups, by adding an electrolyte under thorough, intensive mixing.

A red Azo pigment commonly used in printing inks is C.I. Pigment Red 53 commonly known as Red Lake C. Red Lake C is a yellow-shade or "warm" red used in sheet-fed offset and web offset heat-set inks as well as letter press, gravure and flexographic inks. Red Lake C is made by diazotizing 2-chloro-5-aminotoluene-4-sulfonic acid (C-amine) and coupling this intermediate with Beta-naphthol. Red Lake C is typically laked with barium chloride to form the barium salt having the following formula:

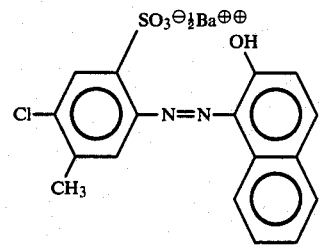

The barium salt of Red Lake C is relatively inexpensive and demonstrates adequate color strength, satisfactory processing characteristics and satisfactory printing characteristics. It is known, however, that in water-based inks, Red Lake C has a strong tendency to "burn-out" when stored over time. "Burn-out" is defined as the tendency of a red pigment to lose its Red Value. For example, a water-based orange ink containing Red Lake C will gradually turn yellow.

There is one commonly known yellow shade red Azo pigment available for use in water-based printing inks which has good "burn-out" resistance: C.I. Pigment Orange 46, a commercial example of which is Clarion Red, manufactured by American Cyanamid Company. Clarion Red is believed to be made by diazotizing 2-amino-5-chloro-4-ethyl-benzene sulfonic acid and coupling the intermediate with Beta-naphthol. The resulting pigment is laked with barium chloride to form the barium salt, Barium Pigment Orange 46, having the following formula:

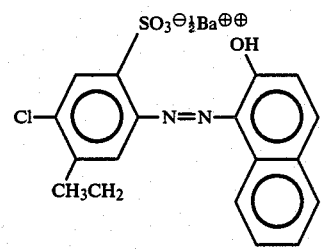

The Red Lake C and the Clarion Red molecules are nearly identical. The only difference is the presence of a methyl group in Red Lake C versus the presence of an ethyl group in Clarion Red. The "burn-out" resistance of Clarion Red is surprising.

Although Clarion Red has superior "burn-out" resistance to Red Lake C, Clarion Red is significantly more expensive.

Surprisingly, C.I. Pigment Red 70 and C.I. Pigment Red 69 have now been found to have good "burn-out" resistance, although the barium salts of both pigments tend to have very low color strength.

C.I. Pigment Red 70 is made by diazotizing the 6-amino-m-toluenesulfonic acid (4B Acid) and coupling the intermediate with Beta-naphthol. C.I. Pigment Red 70 is laked with barium chloride to form the barium salt, Barium Pigment Red 70, having the following formula:

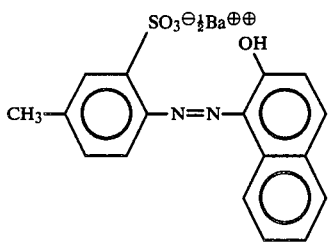

C.I. Pigment Red 69 is made by diazotizing 6-amino-4-chloro-m-toluenesulfonic acid (2B Acid) and coupling the intermediate with Beta-naphthol. This pigment is laked with barium chloride to form the barium salt, Barium Pigment Red 69, having the following formula:

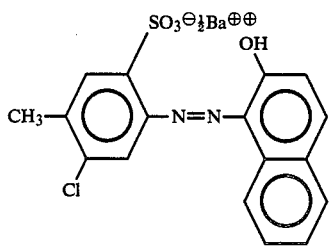

There has not been much commercial interest in either Barium Pigment Red 70 or Barium Pigment Red 69 (neither is registered in the T.S.C.A. inventory). This lack of interest probably comes from neither pigment salt having the color strength of Clarion Red or Red Lake C.

The inventor has studied the effect of various compounds on the color strength of the unexpectedly "burn-out" resistant Barium Pigment Red 69 and Barium Pigment Red 70 in order to obtain pigment compositions with "burn-out" resistance and color strength equal to or better than Clarion Red.

SUMMARY OF THE INVENTION

The present invention relates to novel pigment compositions comprising various azo pigments and various fortified latex dispersions. The pigment compositions have superior color strength while retaining "burn-out" resistance. Specifically, the barium, magnesium, manganese or calcium salt of C.I. Pigment Red 70, C.I. Pigment Red 69 and a fortified latex dispersion.

The preferred embodiments of this novel composition are made by coupling orthanilic acid derivatives (including, optionally, disulfonated amine derivatives) into B-naphthol and precipitating the metal salts, and combining with a fortified latex dispersion.

The composition of this invention will preferably comprise:

72 wt.%–99.0 wt.% of the azo pigment having the formula

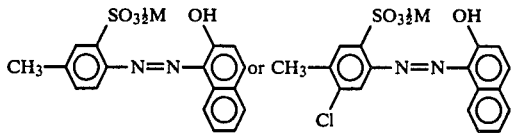

wherein M is a cation selected from the group consisting of barium, calcium, magnesium and manganese; optionally, 0.3 wt.%–8.0 wt.% of the laked product of a disulfonated aromatic amine coupled into Beta-naphthol wherein the aromatic disulfonate amine is a member of the group consisting of 4-amino-1,3 benzene disulfonic acid, 5-amino-1,4 benzene sulfonic acid and 2-amino-1,5 naphthalene disulfonic acid, said coupled and laked disulfonated aromatic amine having been laked with a cation selected from the group consisting of barium, magnesium, manganese and calcium; and 1.0 wt.%–20.0 wt.% of a fortified latex.

A particularly useful embodiment contains Barium Red 70. The initial step in the manufacture of this composition is to form the diazonium salt slurry of 2-amino-5-methylbenzene sulfonic acid (4B Acid) optionally in the presence of 4-amino-1,3-benzene sulfonic acid, 5-amino-1,4-benzene disulfonic acid or 2-amino-1,5 naphthalene disulfonic acid. A coupling solution is prepared consisting of 2-hydroxynaphthalene, sodium hydroxide, water and a fortified latex dispersion.

The fortified latex dispersions are disclosed in prior filed, commonly assigned, copending U.S. patent application Ser. No. 445,410 dated Nov. 30, 1982, now abandoned entitled "Latex Vehicles for Printing Inks and Coatings". U.S. patent application Ser. No. 445,410 dated Nov. 30, 1982 is hereby incorporated by reference into this application. By fortified latexes it is meant latexes that are characterized by the presence of distinct dispersed and soluble polymer phases. The fortified latex may be a physical blend of a water soluble polymer and a dispersed polymer. The dispersed polymer is preferably a high molecular weight acrylic copolymer, while the soluble polymer is preferably a relatively low molecular weight acrylic copolymer containing carboxyl group functionality. The latex may be made by blending these two species as indicated but is preferably made in two stages: (1) the soluble polymer is prepared by solution polymerization where the reaction solvent is exchanged for ammoniated water and (2) the dispersed polymer is prepared by emulsion polymerization, with the soluble polymer serving as the primary surfactant.

By acrylic polymer(s) is meant that one or more of the well known acrylic monomers can be copolymerized. Typical acrylic monomers useful according to this invention include acrylic and methacrylic acid, esters, amides and nitriles. In addition, the use of styrene in the formation of a copolymer has been found especially useful.

Latex polymers that are useful include the polymers and copolymers of ethylenically unsaturated monomers and styrene. Common ethylenically unsaturated monomers include acrylic acid, methacrylic acid, methyl methacrylate, ethyl acrylate, ethyl methacrylate and the like. Especially preferred is a combination of ethylenically unsaturated monomers with styrene in the formation of copolymers useful for both the soluble as well as the dispersed portion of the fortified latexes fo the present invention.

The acrylic coplymer latexes are especially useful as vehicles for printing inks and coatings for polyolefins and other low surface energy substrates. The latexes are typically prepared from (1) a water-soluble acrylic resin, and (2) a dispersed acrylic resin. The aqueous resin solutions are prepared by polymerizing a mixture of styrene and acrylic polymer(s) by conventional methods or under pressure in the presence of a free radical initiator and an organic solvent, followed by distillation of the solvent and replacement with water containing ammonia or an amine. The use of pressure reaction allows the use of such peroxides such as di-tertiary butyl peroxide by increasing the operating temperature. A polymerization carried out in MIBK would normally be run at 15° C., the boiling point at atmospheric conditions. However, at pressures up to 35 psi an operating temperature range of 150°-170° C. is obtained. At 160° C. the half-life of di-tertiary butyl peroxide is approximately 20 minutes and, as such, is convenient for use. A first latex is made by copolymerizing styrene and ethyl hexyl acrylate in the presence of a styrene/ethyl acrylate/acrylic acid terpolymer dissolved in ammonium hydroxide. A second latex is made by homopolymerizing ethyl hexyl acrylate in the presence of a styrene/ethyl acrylate/acrylic acid terpolymer dissolved in ammonium hydroxide. A third latex is made by homopolymerizing styrene in the presence of a styrene/ethyl acrylate/acrylic acid terpolymer dissolved in ammonium hydroxide. Although these fortified latex dispersions are effective, similar commercial fortified latex dispersions, like Joncryl 74, Joncryl 134, and Joncryl 77, manufactured by S. C. Johnson, Racine, Wis. also are effective.

The diazonium salt slurry is added to the coupler/latex dispersion and, after coupling, the pH is increased to 7-8 using Sodium Hydroxide. After stirring for one hour, barium chloride solution is added, the pH is adjusted to 10, the slurry is heated and filtered.

The resulting C.I. Barium Red 70 Pigment compositions exhibited superior "burn-out" resistance and tinting strength against Clarion Red.

The resulting pigment compositions of this invention can be used in various water-based ink compositions and dispersions.

This invention is further illustrated by the following examples in which parts and percentages are on a weight basis unless otherwise stated.

EXAMPLE 1

A first diazonium salt slurry was prepared by dissolving 31.6 parts of 2-amino-4-chloro-5-methylbenzenesulfonic acid acid (2B Acid) in 120 parts of water and 10.5 parts of 28% ammonium hydroxide. The acid was reprecipitated by adding 38 parts of 31.5% hydrochloric acid, cooling the slurry with ice to 0° C., then adding, over 5 minutes, a solution of 10.5 parts of Sodium Nitrite dissolved in 50 parts of water and stirring at 0° C. for 30 minutes. A second diazonium salt slurry was prepared in a similar manner using 26.5 parts of 2-amino-5-methylbenzene sulfonic acid (4B Acid). A third diazonium salt slurry was similarly prepared using 31.6 parts of 2-amino-4-methyl-5-chlorobenzene sulfonic acid (C Amine).

A coupling component solution was prepared by dissolving 61 parts of 2-hydroxynaphthalene in 450 parts of water containing 24.2 parts of sodium hydroxide, diluting to 1200 parts and dividing the solution into three equal portions at 27° C.

Each of the diazonium salt slurries at 0° C. was added to one part of the coupling component solution at 27° C. over 30 minutes, with the temperature maintained at 23°-27° C. After coupling, the pH of the slurries was adjusted to 8-9 with 10% sodium hydroxide. Then, one third of a solution of 24 parts hydrogenated rosin (Staybelite) dissolved in 300 parts of water at 90° C. containing 3.2 parts of sodium hydroxide, was added over 5 minutes to each slurry. Next, one third of a solution of 52.5 parts of barium chloride dihydrate dissolved in 300 parts of water was added to each slurry. This addition formed a slurry of Barium Red 69 (Pigment Red 69, C.I. 15595) from the first slurry, Barium Red 70 (Pigment Red 70, C.I. 15590) from the second slurry, and Red Lake C (Pigment Red 53, C.I. 15585:1) from the third slurry. These slurries were then heated with steam, with the following results: the Barium Red 69 never thickened or changed shade when heated to 95°-100° C. and held at 95° C. for 30 minutes; the Barium Red 70 thickened at 90° C., but did not change shade; the Red Lake C changed shade at 75°-85° C. and was held at 85° C. for 15 minutes. The slurries were filtered with suction and washed with water until the filtrates showed no excess chloride ion with silver nitrate solution.

The resulting presscakes weighed 189 parts (30.4% Barium Red 69), 249 (25.1% Barium Red 70) and 281 parts (23.8% Red Lake C).

The resulting pigment compositions were tested for tinting strength in accordance with Procedure A. In comparison with Clarion Red (20-7150), the Barium Red 69 was 50% weak, the Barium Red 70 was 55% weak, and the Red Lake C was 7% weak. When tested for "burn-out" resistance in accordance with Procedure B, the Barium Red 69 and Barium Red 70 lost essentially no strength, whereas the Red Lake C lost 100% of its strength after 4 days at room temperature or 1 day at 120° F.

TESTING PROCEDURES

Initial Pigment Dispersion

The pigment presscake was dispersed at a 1:1 pigment to resin ratio in the following manner: To a Jiffy Mill were added enough presscake to give 10.0 parts real pigment, 33.3 parts of a 30% acrylic resin (Joncryl 678) solution in ammonium hydroxide, 1.0 part silicone defoamer and enough water to make the total 100 parts. Then 340 parts of 1/32 inch diameter steel shot were added, the Jiffy Mill was capped and shaken on a Red Devil paint shaker for 15 minutes to give a pigment dispersion.

Procedure A—Tinting Strength 95 parts of a white, water-based test ink and 5 parts of the 10% pigment dispersion (either experimental pigment presscake or Clarion Red 20-7150) were added to a Jiffy Mill. The Jiffy Mill was capped and shaken on a Red Devil paint shaker for 15 minutes to give a tinted white. Approximately 1.0 part of the tinted whites (from experimental pigment and Clarion Red 20-7.50) were drawn down, side-by-side, with a #24 wire wound rod on white stock (I.P.I. Form #113). Equal strength pigments appeared equally strong in the drawdowns. When one tinted white appeared stronger, more white ink was added to it until it had an equivalent appearance in the drawdown; the amount of white ink added indicated the relative tinting strength.

Procedure B—"Burn-Out" Resistance

The following components were added to a Jiffy Mill: 10 parts of the Initial Pigment Dispersion and 90 parts of a premixed dispersion containing 17 parts AAOT Diarylide Yellow, 19 parts titanium dioxide, 5 parts acrylic resin (Joncryl 678), 4 parts silicon defoamer and wax compound, and 45 parts dilute ammonium hydroxide (pH 8.5). The Jiffy Mill was capped and shaken on a Red Devil paint shaker for 15 minutes to give an orange ink. Approximately 1 part of the orange inks (from experimental pigment and Clarion Red 20-7150) were placed on a flexo hand proofer (Pamarco) and rolled out, side-by-side, on white stock; the red value of each ink was noted. Each ink was divided into two portions and placed in separate jars. One portion was stored in an oven maintained at 120° F., while the other portion was stored at room temperature. At certain intervals (e.g., 1 day, 3 days and 7 days), samples of the oven-aged ink and room temperature inks were taken and rolled out, side-by-side, with the Clarion Red 20-7150 orange ink, on white stock using the flexo hand proofer. Any changes in Red values were observed and noted.

EXAMPLE 2

A diazonium salt slurry was prepared by dissolving 27.5 parts of 2-amino-5-methylbenzene sulfonic acid (4B Acid) in 360 parts of water containing 6 parts of sodium hydroxide, precipitating the acid over 10 minutes with 38 parts of 31.5% hydrochloric acid, then cooling the slurry to 0° C. with ice and adding over 5 minutes a solution of 10.4 parts of sodium nitrite dissolved in 25 parts of water. The resulting diazonium salt slurry was stirred at 0° C. for 1 hour, then the excess nitrous acid was eliminated by the addition of 4B Acid as needed.

The coupling component solution was prepared by dissolving 21.6 parts of 2-hydroxynaphthalene in 380 parts of water containing 8 parts of sodium hydroxide. To this solution was added 24.1 parts of a fortified latex made by copolymerizing 21.4 parts styrene and 13.7 parts 2-ethyl hexyl acrylate in the presence of 15 parts of a styrene/ethyl acrylate/acrylic acid terpolymer dissolved in ammonium hydroxide; the temperature of the coupler/latex dispersion was adjusted to 27° C.

The diazonium salt slurry at 0° C. was added over 30 minutes to the coupler/latex dispersion with the temperature maintained at 23°-27° C. with steam. After coupling, the pH (6.5) was increased to 7-8 with 10% sodium hydroxide solution. After stirring 1 hour, the slurry showed no excess diazonium salt in a spot test with H-Acid. A solution of 36.6 parts barium chloride dihydrate in 100 parts water was added over 15 minutes. The pH was adjusted to 10 wth 10% sodium hydroxide and the slurry was heated to 95° C. over 30 minutes; after 10 minutes at 95° C., the slurry thickened. The slurry was filtered and washed with water to give 288 parts comprising 24.8% Barium Red 70.

When tested for tinting strength in accordance with Procedure A, the Barium Red 70 was 10% weak versus Clarion Red 20-7150. When tested for "Burn-Out" resistance in accordance with Procedure B, the Barium Red 70 lost about 20-30% of its strength after 7 days at 120° F.

EXAMPLE 3

A composition of Barium Red 70 was prepared by repeating the procedure of Example 2, except that 15.4 parts of Lytron 5200 (a polystyrene latex dispersed with a sulfated anionic surfactant) was used in place of the latex of example 2. On being treated, the slurry thickened at 83° C.

When tested for tinting strength in accordance with Procedure A, the Barium Red 70 was more than 70% weak vs. Clarion Red 20-7150.

EXAMPLE 4

The procedure of Example 2 was repeated, except that the diazonium salt slurry was made with 26.8 parts of 4B Acid and 1.1 parts of 4-amino-1,3-benzene disulfonic acid, and the coupling component contained 15.4 parts of fortified latex of example 2 and was iced to 0° C.

When tested for tinting strength in accordance with Procedure A, the Barium Red 70 was 5% stronger and more opaque than Clarion Red 20-7150. When tested for "burn-out" resistance in accordance with Procedure B, the Barium Red 70 gained 10-20% strength after 7 days at 120° F.

EXAMPLE 5

The procedure of Example 2 was repeated, except that the diazonium salt slurry was made with 26.6 parts of 4B Acid and 2.8 parts of 2-amino-1,5 naphthalene disulfonic acid and the coupling component contained 15.4 parts of the fortified latex example 2.

When tested for tinting strength in accordance with Procedure A, the Barium Red 70 was 6% stronger and more opaque than Clarion Red 20-7150. When tested for "burn-out" resistance in accordance with Procedure B, the Barium Red 70 composition gained approximately 10% strength after 7 days at 120° F.

EXAMPLE 7

The procedure of Example 5 is repeated, except that the fortified latex is (made by homopolymerizing 30 parts styrene in the presence of 20 parts of a styrene-/ethyl acrylate/acrylic acid terpolymer dissolved in ammonium hydroxide and is used in place of the fortified latex of Example 2. When tested for tinting strength in accordance with Procedure A, the Barium Red 70 was 5% stronger than Clarion Red 20-7150. When tested for "burn-out" resistance in accordance with Procedure B, the composition showed no change after 7 days at 120° F.

EXAMPLE 8

The procedure of Example 4 is repeated except that the composition is laked with 22.1 parts of calcium chloride dihydrate.

When tested for tinting strength in accordance with Procedure A, the Calcium Red 70 is bluer and 20% weaker than Clarion Red 20-7150. When tested for "burn-out" resistance in accordance with Procedure B, the composition lost 10% strength after 7 days at 120° F.

EXAMPLE 9

The procedure of Example 4 is repeated except that the composition is laked with 30.5 parts of Magnesium Chloride Hexahydrate.

The Magnesium Pigment Red 70 composition is yellower and exhibits slightly inferior tinting strength* and "burn-out" resistance** vs. Clarion Red 20-7150.

EXAMPLE 10

The procedure of Example 4 is repeated except that the composition is laked with 29.7 parts of Manganous Chloride.

The Manganese Pigment Red 70 composition was bluer and exhibits slightly inferior tinting strength* and "burn-out" resistance** vs. Clarion Red 20-7150.

EXAMPLE 11

The procedure of Example 4 is repeated except that the diazonium salt slurry was made with 32.0 parts of 6-amino-4-chloro-m-toluenesulfonic acid (2B Acid) in place of the 4B Acid.

The resulting C.I. Barium Pigment Red 69 composition exhibited superior tinting strength.**

EXAMPLE 12

The procedure of Example 11 is repeated, except that the composition is laked with 22.1 parts of Calcium Chloride Dihydrate.

The resulting Calcium Pigment Red 69 composition exhibits slightly inferior tinting strength.

EXAMPLE 13

The procedure of Example 11 is repeated, except that the composition is laked with 30.5 parts of Magnesium Chloride Hexahydrate.

The resulting Magnesium Pigment Red 69 composition exhibits slightly inferior tinting strength* and "burn-out" resistance**.

EXAMPLE 14

The procedure of Example 11 is repeated, except that the composition is laked with 29.7 parts of Manganese Chloride.

The resulting Manganese Red Pigment 69 composition exhibits slightly inferior tinting strength* and "burn-out" resistance** versus Clarion Red 20-7150.

* Procedure A
** Procedure B

I claim:

1. An azo pigment composition comprising: about 72.0 wt. percent to about 99.0 wt. percent of a laked azo pigment selected from the group consisting of:

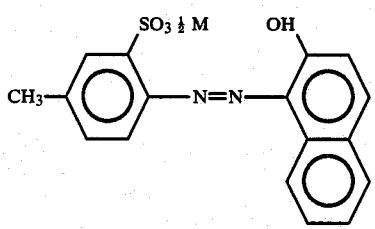

and

-continued

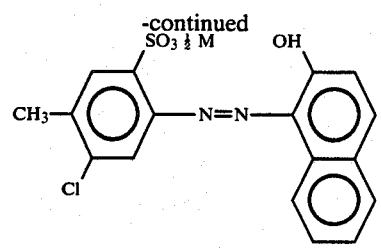

wherein M is a cation selected from the group consisting of barium, calcium, magnesium, and manganese; about 1.0 wt. percent to about 20.0 wt. percent of a fortified latex characterized by the presence of distinct dispersed and soluble polymer phases.

2. The azo pigment composition as recited in claim 1 additionally containing about 0.3 wt.% to about 8.0 wt.% of the laked product of a disulfonated aromatic amine coupled with Beta-napthol.

3. The azo pigment composition of claim 1, wherein the azo pigment comprises:

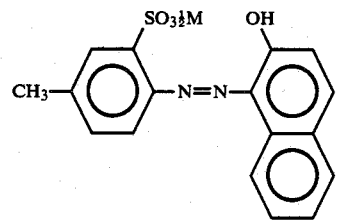

4. The azo pigment composition of claim 1 wherein the azo pigment comprises:

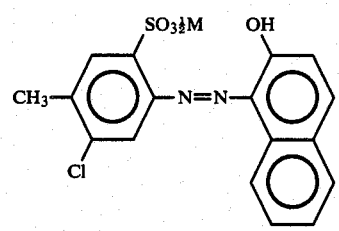

5. The azo pigment composition of claim 1, wherein the cation is barium.
6. The azo pigment composition of claim 1, wherein the cation is calcium.
7. The azo pigment composition of claim 1 wherein the cation is magnesium.
8. The azo pigment composition of claim 1 wherein the cation is manganese.
9. The azo pigment composition of claim 1 wherein the fortified latex comprises a member of the group consisting of:
   a. styrene-2-ethyl hexyl acrylate copolymer dispersed in an alkaline solution of a styrene-ethyl acrylate-acrylic acid terpolymer;
   b. styrene homopolymer dispersed in an alkaline solution of styrene-ethyl acrylate-acrylic acid terpolymer; and,
   c. ethyl hexyl acrylate homopolymer dispersed in an alkaline solution of styrene-ethyl acrylate-acrylic acid terpolymer.
10. The azo pigment composition of claim 2, wherein the aromatic disulfonated amine comprises a member of the group consisting of:
   a. 4-amino-1,3 benzene disulfonic acid;
   b. 5 amino-1,4 benzene disulfonic acid; and
   c. 2-amino-1,5 naphthalene disulfonic acid.
11. The pigment composition of claim 2, wherein the product of a disulfonated aromatic amine coupled with beta-naphthol is laked with a cation comprising a member of the group consisting of barium, calcium, magnesium and manganese.

* * * * *